United States Patent [19]

Zenner

[11] Patent Number: 4,930,298
[45] Date of Patent: Jun. 5, 1990

[54] CUTTING UNIT COVER

[75] Inventor: Michael N. Zenner, Lakeville, Minn.

[73] Assignee: The Toro Company, Minneapolis, Minn.

[21] Appl. No.: 324,120

[22] Filed: Mar. 16, 1989

[51] Int. Cl.$^5$ ............................................. A01D 67/00
[52] U.S. Cl. ..................................... 56/17.4; 56/320.1
[58] Field of Search ............. 56/17.4, 320.1, DIG. 20, 56/DIG. 24; 403/DIG. 1, 404, 410; 248/206.5

[56] References Cited

U.S. PATENT DOCUMENTS 2,865,159 12/1958 Musgrave ............................ 56/17.4
4,178,977 12/1979 Sur et al. ............................ 56/320.1
4,312,421 1/1982 Pioch ................................. 56/320.1

FOREIGN PATENT DOCUMENTS 2167636 6/1986 United Kingdom ................. 56/17.4

OTHER PUBLICATIONS

Sheet entitled "Cutting Unit Model No. 30544 (Continued)," manufactured by The Toro Company.
Sheet entitled "36 Cutting Deck Model No. 30136," manufactured by The Toro Company.
Sheet entitled "Cutting Unit MOdel No. 30564 (Continued)," manufactured by The Toro Company.
Leaflet entitled "M48-11 & M48-11H, 11HP (48" Cut)," manufactured by Ransomes Manufacturing Company.

Primary Examiner—Bruce M. Kisliuk
Attorney, Agent, or Firm—R. Lawrence Buckley

[57] ABSTRACT

A plastic cover for a rotary deck. A preferred cover (54a) is connected to a wing deck (28a) by magnetic latches and mechanical securing means. The magnetic latches preferably include magnets (69) connected to the deck and magnetic plates (66) fixed to the underside of the deck cover (54a). The mechanical securing means preferably includes a pair of pins (70) extending upwardly from the deck proximate magnets (69), wherein the deck cover (54a) forms a pair of apertures (72) for receiving pins (70). Pins (70) and apertures (72) prevent horizontal or shearing motion of deck cover (54a) relative to deck (28a), whereas the magnetic latches prevent vertical movement of cover (54a) relative to deck (28a). Hooks (64) or a flange (73) can be used to secure one of the edges of cover (54a), as well.

9 Claims, 3 Drawing Sheets

CUTTING UNIT COVER

FIELD OF THE INVENTION

The invention pertains generally to harvesting devices, and more particularly to covers for harvesting device cutting units.

BACKGROUND OF THE INVENTION

A conventional turf mowing machine includes one or more turf mowing units, or cutting units, which are either of the reel or rotary type. A reel cutting unit typically includes a frame carrying a horizontal bed knife and a horizontally rotating cutting reel which work in conjunction to shear the grass. A rotary cutting unit, on the other hand, includes a substantially planar deck under which is rotationally mounted one or more cutting blades for cutting the grass by impact. Each blade is driven by a pulley or hydraulic motor and the rotational axis of each blade-driving device is vertical. Reel cutting units are normally used when high precision cutting is in order. Rotary units are employed where greater cutting capacity is required and there is less need for precision. Although the present invention could be applied to any type of harvesting device cutting unit, for the sake of brevity the following discussion will focus on turf mowing apparatus having rotary cutting units.

Most of the moving parts of a rotary cutting unit, with the exception of the cutting blades themselves, are mounted on the top surface of the substantially planar deck, in an attempt to isolate the belts, pulleys, hydraulic motors, etc. from the dirt, grass clippings, and debris which normally accompany grass mowing. A deck cover, mounted horizontally to the deck, is often used to enclose the moving parts atop the deck for the sake of safety and to further eliminate fouling of the moving parts by debris. The present invention is primarily directed toward such a deck cover, and is also pertains to unique means for securing the deck cover to the deck.

Deck covers have traditionally been made of sheet steel. Although metal deck covers are generally adequate, as a class they possess several disadvantages. First and foremost, such covers are obviously quite heavy. Also, metal deck covers tend to rattle, thereby creating unnecessary noise, particularly when the mower is traveling at high speeds across rough terrain. Steel covers are typically painted and tend to become scratched with use, particularly since they are located immediately atop the deck in an exposed area. Moreover, if a steel cover becomes dented, twisted or bent for one reason or another, this tends to misalign the holes in the cover relative to the mating studs, etc. attached to the deck, thereby making it very difficult to connect the cover to the deck.

Metal deck covers have historically been secured using conventional threaded fasteners, e.g., thumb screws or the like. While such fasteners hold deck covers in place fairly well, once they are removed during maintenance or repair procedures they are oftentimes misplaced. Also, threaded connectors, unless somehow locked in place, tend to loosen during use, contributing to the looseness and rattling of the metal deck covers.

One suggested approach to the deck cover fastener problem is to use overcenter clamps. Such clamps don't have a tendency to loosen like threaded connectors and are not subject to being lost during cleaning and servicing operations. However, they are comparatively costly; tend to be "knuckle busters"; and involve moving parts which can clog and corrode in the rugged operating environment of a commercial lawn mower.

With regard to the disadvantages associated with a metal deck cover, Ransomes Manufacturing Company has used plastic deck covers on its M48 series mowers, for example. While the Ransomes plastic deck covers address the noise problem associated with steel covers; are more scratch resistant than steel covers; are at least potentially lighter than steel covers; and are less likely to irreparably bend, twist or dent, Ransomes uses large threaded plastic knobs and Velcro strips to secure the M48 cover to the deck. The threaded knobs can loosen with use and easily be misplaced, as discussed above; and the use of Velcro strips to connect a deck cover to a deck can create problems, given the oil and debris which are normally present in the typical mowing environment.

The present invention addresses the problems associated with traditional metal cutting unit covers, and in particular the problems associated with metal covers and traditional threaded fastener means for securing such covers to mowing decks, for example.

SUMMARY OF THE INVENTION

Accordingly, the invention is a harvesting device cutting unit including a cutting element; a frame for rotatably supporting the cutting element; a plastic cover for the cutting element frame; and means for magnetically securing the cover to the frame.

Although the cutting unit could be of the reel or rotary type, the preferred embodiment is a rotary cutting unit wherein the "frame" referred to above includes a deck and the plastic cover mounts atop the deck. The "magnetic securing means" preferably includes a magnet connected to the deck and a magnetic element (e.g., a steel plate) connected to the plastic deck cover. When the deck cover is connected to the deck, the magnet acts upon the magnetic element to assist in holding the cover against the deck.

While various materials and fabrication techniques are contemplated, the cover is preferably rotomolded polyethylene.

Preferably, the "magnetic securing means" secures the cover to the deck in a first direction (e.g., horizontal or vertical), and the cutting unit further includes means for mechanically securing the cover to the deck in a second direction substantially perpendicular to the first direction. Therefore, the "magnetic securing means" could be used to restrain the deck cover from horizontal movement relative to the deck, and the mechanical securing means could be used to fix the deck cover to the deck vertically. However, in the preferred embodiment, a "magnetic securing means" holds the cover down vertically and a "mechanical securing means" prevents lateral sliding of the deck cover relative to the deck.

The "mechanical securing means" preferably includes a pin connected to and extending upwardly from the deck and an aperture formed in the deck cover suitable for receiving the pin.

In addition to the "magnetic securing means," a "mechanical securing means" could be included to prevent vertical movement of one edge of the deck cover. For example, hooks or flanges connected to the deck could be used to secure one edge of the deck cover whereas magnetic latches could be used to secure the opposite edge of the deck cover.

The invention will be further described with reference to the Drawing which is briefly described below.

BRIEF DESCRIPTION OF THE DRAWING

A preferred embodiment of the invention is shown in the appended Drawing, in which.

DETAILED DESCRIPTION OF PREFERRED EMBODIMENT

Figure 1:
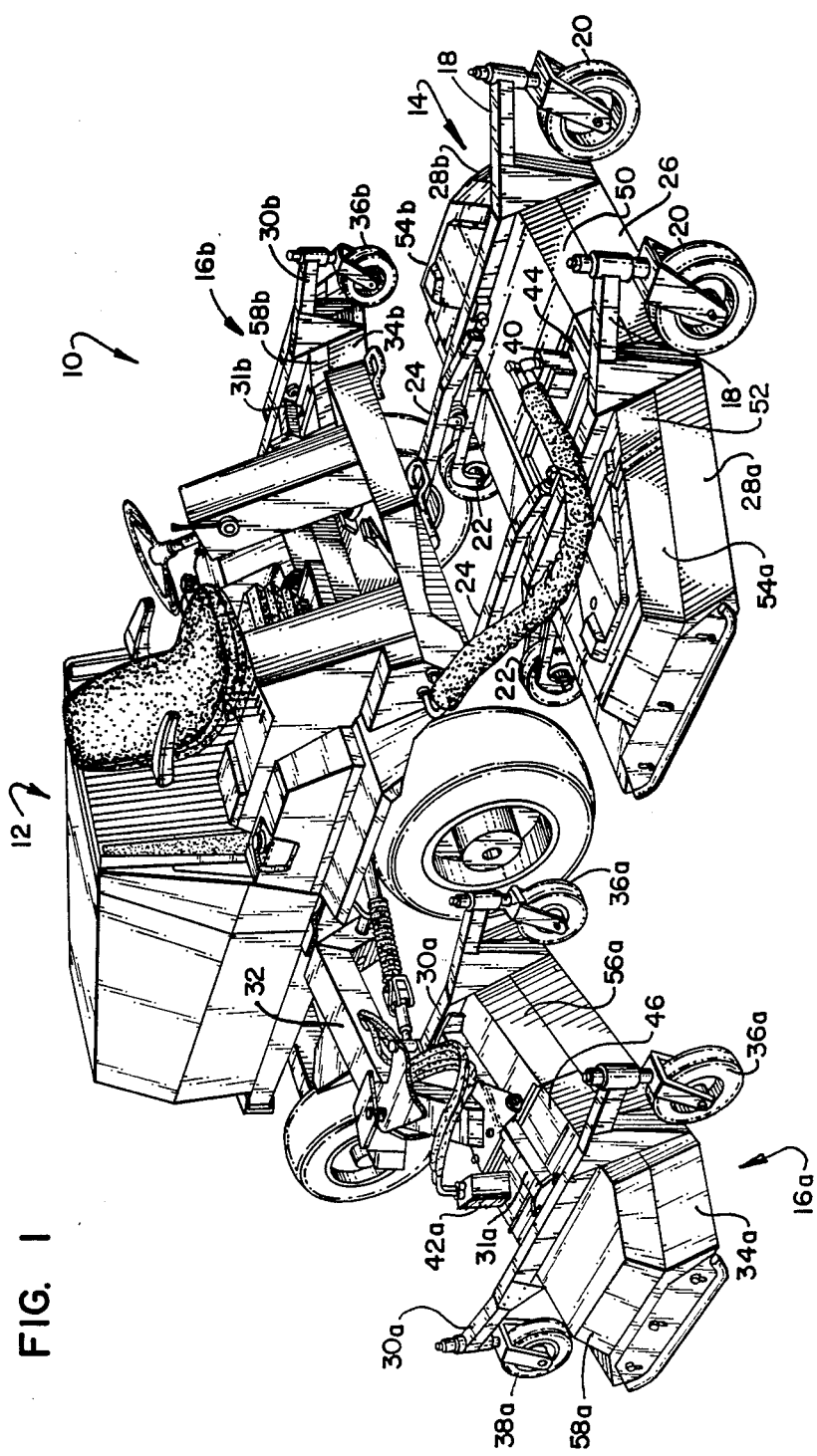
FIG. 1 is a perspective view of a large commercial mower incorporating the invention, the mower including a front mowing unit and a pair of side mowing units.

With reference to the Drawing, wherein like reference numerals designate like parts and assemblies throughout the several views, FIG. 1 perspectively shows a mower 10 according to the invention. It should be noted at the outset that the invention can be applied to smaller, even walk-behind type, rotary mowers and to reel mowers as well. Mower 10 is the preferred, not the exclusive, embodiment of the invention.

Mower 10 includes a rather large four-wheeled traction vehicle 12 which supports a front mowing unit 14, a right side mowing unit 16a and a left side mowing unit 16b. Front mowing unit 14 includes a pair of laterally-spaced longitudinal frame members 18 each supported by a front-mounted caster wheel 20 and a rear wheel 22. Frame members 18 are parallel to the longitudinal axis of traction vehicle 12 and are connected to traction vehicle 12 through a pair of lift arms 24 which extend forwardly from traction vehicle 12. Lift arms 24 are preferably hydraulically powered so as to lift and/or counterbalance front mowing unit 14, as desired. Suspended beneath longitudinal frame members 18 is a steel center deck 26, a steel right wing deck 28a, and a steel left wing deck 28b, the wing decks 28 being mirror images of one another in most respects. Wing decks 28 are longitudinally hingedly connected to center deck 26 so that they can pivot relative thereto in the manner shown in FIG. 3 (a rear elevational view of right wing deck 28a and a portion of center deck 26).

Similarly, each side mowing unit 16a or 16b includes a pair of longitudinal frame members 30 each supported by a front caster wheel 36 and a rear wheel 38. Spanning between longitudinal frame members 30 is a transverse frame or roll member 31 which is supported at its midpoint by a pivotal lift arm assembly 32 extending laterally from traction vehicle 12. Suspended beneath each set of frame members 30 and 31 is a steel deck 34a (right) or 34b (left). It should be emphasized that each deck assembly, e.g., right side deck 34a and associated frame members 30a and 31a, constitutes a "frame" suitable for rotatably supporting the blade. As noted above, the invention could apply to a reel mowing unit as well, the "frame" in that case operatively supporting the reel and the bed knife.

Figure 3:
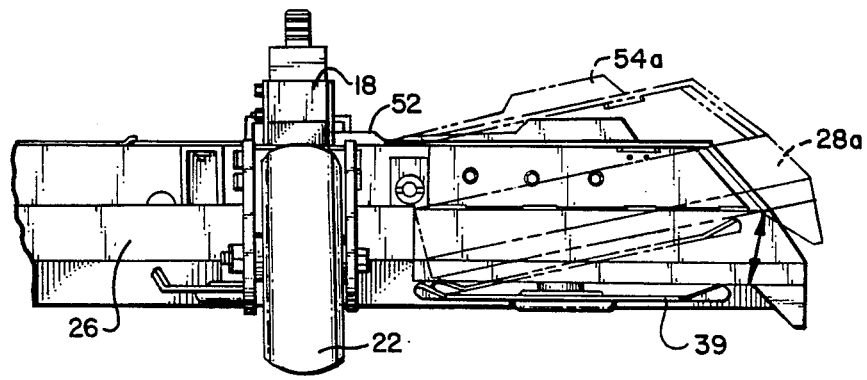
FIG. 3 is a rear elevational view of the right hand portion of the front mowing unit shown in FIG. 1.

In the preferred embodiment shown in the Drawing, the mowing units 14 and 16 of mower 10 are rotary mowing units wherein blades rotating about vertical axes are mounted beneath decks 26, 28 and 34. FIG. 3 shows a rotary blade 39 mounted beneath the right wing deck 28a, for example. In the embodiment shown in the Drawing, the rotary blades are ultimately powered hydraulically. Front mowing unit 14 includes a hydraulic motor 40 whereas the side mowing units 16a and 16b include hydraulic motors 42a and 42b, respectively. Motor 40 of front mowing unit 14 is supported by a steel horizontal plate 44 which in turn is supported fore and aft by center deck 26. Similarly, motors 42 of side units 16 are supported by steel plates 46 connected fore and aft to decks 34. Belts and pulleys mounted atop decks 26, 28 and 34 distribute mechanical power from hydraulic motors 40 and 42 to the cutting blades. These pulleys and belts are preferably covered in some manner for the sake of safety and to isolate them from grass clippings, leaves, dirt, and other debris normally associated with turf mowing. As the present invention primarily relates to such cutting unit covers, the remainder of this discussion will focus on same.

Referring to FIG. 1, center deck 26 carries two covers, a center deck left cover 50 and a center deck right cover 52. Wing decks 28a and 28b include wing deck covers 54a and 54b, respectively. And, side mowing units 16a and 16b support inner covers 56a and 56b, respectively, and outer covers 58a and 58b, respectively. Covers 50, 52, 54, 56 and 58 are preferably made of rotomolded polyethylene, having a nominal thickness of about 3/16 inch. Clearly, other fabrication techniques and materials could be used, as well known by those skilled in the art of plastic fabrication.

It should be noted that a "plastic cover," as that phrase is used herein, refers to a cutting unit cover which is substantially, though not necessarily exclusively, made of plastic. Although in theory each deck cover could be quite unique to accommodate the particular pulleys, belts, etc. to be enclosed thereby, in the preferred embodiment shown in the Drawing outer covers 58a and 58b; inner covers 56a and 56b; and wing deck covers 28a and 28b are, respectively, mirror images of one another. That is, outer cover 58a is a mirror image of outer cover 58b, and so on. This approach is desired in that it minimizes design and tooling costs. Cover 52 is smaller than cover 50 because of the asymmetrical placement of hydraulic meter 40.

The shapes and sizes of the deck covers are, except as noted below, quite traditional. That is, they are generally flat on top and have oblique sides which taper outwardly and downwardly to blend with the sides of the decks themselves when the covers are secured to the decks. Also, in the preferred embodiment all of the deck covers are secured in substantially the same manner, at least in principle.

Therefore, for the sake of brevity, the remaining discussion will focus primarily on front mowing unit 14, and in particular right wing deck cover 54a and means for securing same to right wing deck 28a, shown in FIGS. 2-5.

Referring to FIG. 2-5, right wing deck cover 54a is a trapezoidal structure, having left and right (operator's perspective) upper lateral edges 60 and 62, respectively, which are parallel to one another and to the longitudinal axis of the mower. Cover 54a is "vertically secured" to wing deck 28a, i.e., secured against vertical movement relative to deck 28a, at its lateral edges 60 and 62.

Figures 4, 5:
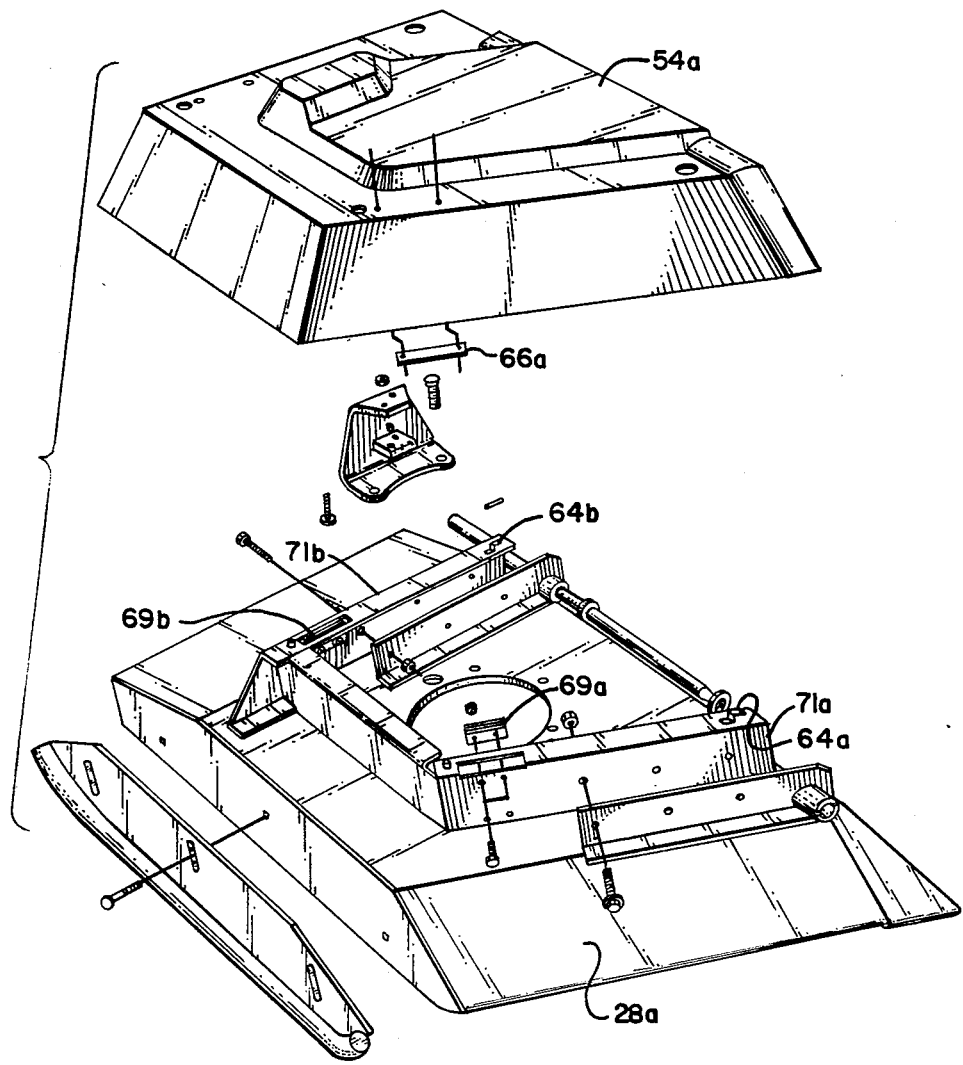
FIG. 4 is a sectional view of a portion of the front mowing unit shown in FIGS. 1 and 2, taken generally along line 4—4 of FIG. 2.
FIG. 5 is an exploded view of the right hand portion of the front mowing unit show in FIG. 1.

Left edge 60 is held down by front and rear hooks 64a and 64b, respectively. Front hook 64a is shown in FIG. 4. As can be seen, hook 64a includes a fairly short vertical portion 65 connected to deck 28a and a longer horizontal portion 67 extending roughly toward the longitudinal center line of mower 10. When cover 54a is in position, the underside of horizontal portion 67 bears downwardly on the cover 54a.

Right lateral edge 62 of cover 54a is vertically secured magnetically. Front and rear magnetic plates 66a and 66b, respectively, preferably made of low carbon steel, are riveted to the underside of cover 54a adjacent edge 62. Plates 66 are magnetically attracted by a pair of permanent magnets 69a and 69b fixed to right wing deck 28a. See FIG. 5. Obviously, magnets 69 could be secured to the cover rather than the deck, and magnetically coupled directly to steel deck 28a, but this would tend to make the cover heavier with no offsetting benefits.

Right wing deck cover 54a is horizontally restrained, i.e., restrained against horizontal sliding movement relative to wing deck 28a, primarily by the mechanical interaction between front and rear posts or studs 70a and 70b, respectively, extending upwardly from deck 28a and front and rear mating apertures 72a and 72b, respectively, formed in cover 54a, each aperture 72a or 72b being closely adjacent to the corresponding magnetic plate 66a or 66b. Hooks 64 do help to prevent lateral sliding of cover 54a to a degree, but posts 70 are particularly helpful in this regard because they prevent lateral movement in all directions, whereas hooks 64 only prevent lateral movement in one direction (e.g., away from the longitudinal axis of mower 10, for cover 54a).

Cover 54a is thus secured vertically and horizontally, but traditional threaded fasteners and clamps are avoided: cover 54a is vertically secured by hooks 64 and magnetic "latches" consisting of plates 66 in conjunction with permanent magnets 68 affixed to deck 28a; and horizontally or laterally constrained against sliding movement by the interaction of posts 70 and mating apertures 72. The post/aperture scheme prevents shearing or sliding from occurring between magnetic plates 66 and the mating permanent magnets 68. The importance of the post/aperture technique (or the equivalent) stems from the fact that while the magnetic latches are quite strong in terms of preventing lifting of cover 54a relative to the deck 28a, they are not particularly effective in terms of preventing horizontal shearing or sliding of cover 54a relative to deck 28a. Also, the post/hole technique properly locates cover 54a relative to deck 28a, so that magnetic plates 66 automatically align with magnets 68 secured to deck 28a.

FIG. 5 shows an exploded view of right wing deck 28a and cover 54a. The cutting blade and its driving components have been removed for the sake of clarity. As shown, magnets 69a and 69b are attached to the vertical portions of channels 71a and 71b, respectively, of deck 28a. The top horizontal portions of channels 71 are slotted immediately above magnets 69. This arrangement protects magnets 69 and, since magnets 69 are preferably screwed to channels 71, permits the easy replacement of magnets 69 should they begin to lose their magnetic strength.

Figure 2:
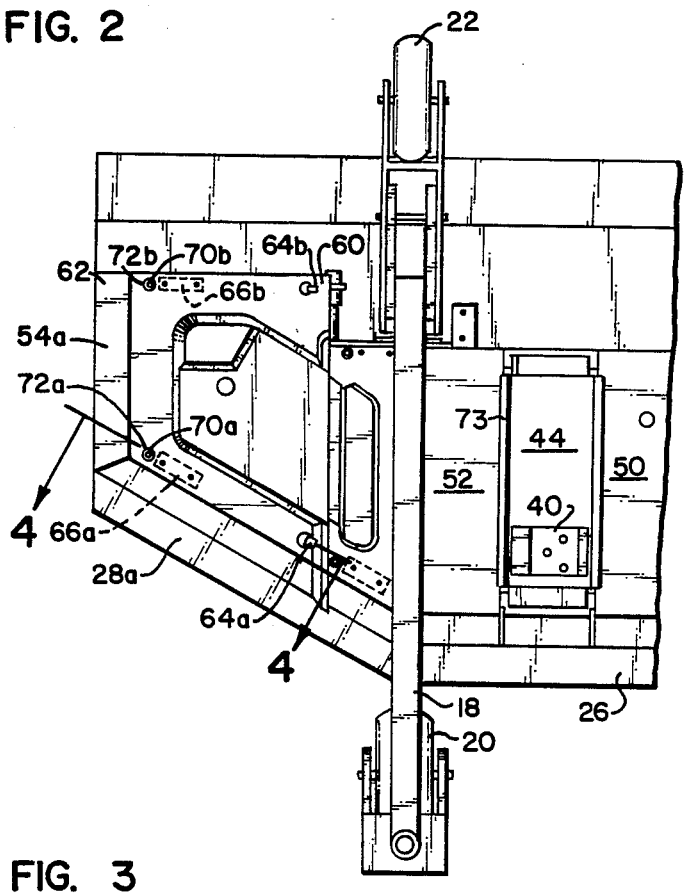
FIG. 2 is an enlarged top plan view of the right hand (from the operator's perspective) portion of the front mowing unit shown in FIG. 1.

This same basic cover securement technique is preferably applied to all of the deck covers, including center deck right cover 52 shown in FIG. 2. The right lateral edge of cover 52 is vertically secured by a pair of magnetic latches, in the same manner as right edge 62 of cover 54a. The right lateral edge of cover 52 is horizontally secured by posts interacting with apertures in cover 52, again in the same manner as right edge 62 of cover 54a. The left lateral edge of cover 52 fits beneath a flange 73 formed by the right lateral edge of hydraulic motor support plate 44. Thus, flange 73 serves substantially the same function as do hooks 64 vis-a-vis' right wing cover 54a.

It should be noted that the left lateral edge of wing deck cover 54a overlaps the right lateral edge of center deck cover 52 so that when wing deck 28a pivots in the manner shown in FIGS. 3 cover 54a can simply slide over center deck cover 52 and slightly flex to permit this hinging action to occur.

Preferably, magnets 68 are of the sandwich or laminated type. It should also be noted that throughout the present application the term "magnetic" connotes something that is magnetized, capable of being magnetized, or simply attracted and/or repelled by a force created by a magnetic field. A "magnet" in the present application may be either a permanent magnet or an electromagnet.

There are other modifications which will be apparent to those skilled in the art. Accordingly, the scope of this invention will be limited only by the appended claims.

I claim:

1. A harvesting device cutting unit comprising:
    (a) a cutting element;
    (b) a frame for rotatably supporting the cutting element;
    (c) a plastic cover for the cutting element frame;
    (d) first means for securing the cover to the frame in a first direction comprising means for magnetically securing the cover to the frame; and
    (e) second means for securing the cover to the frame in a second direction substantially perpendicular to the first direction, wherein the first direction is substantially vertical and the second direction is substantially horizontal, and wherein:
        (i) the cover comprises first and second edges;
        (ii) the magnetic securing means of the first securing means comprises a magnet connected to the frame and a magnetic element connected to the first edge of the cover, wherein when the cover is connected to the frame, the magnet acts upon the magnetic element to assist in downwardly drawing the first edge of the cover against the frame;
        (iii) the first securing means further comprises first mechanical means for downwardly holding the second edge of the cover against the frame; and
        (iv) the second securing means comprises second mechanical means for engaging the first edge of the cover and preventing horizontal movement of the cover relative to the frame.

2. The cutting unit of claim 1, wherein the first mechanical means comprises a hook for engaging a hook aperture proximate the second edge of the cover.

3. The cutting unit of claim 1, wherein the first mechanical means comprises a flange for engaging the second edge of the cover.

4. A rotary cutting unit comprising:
    (a) a rotary blade;
    (b) a deck for rotatably supporting the rotary blade;
    (c) a rotomolded plastic cover for the deck, the cover having first and second lateral edges;

(d) magnetic latches for fixing the first lateral edge of the deck cover vertically with respect to the deck;

(e) hooks for vertically securing the second lateral edge of the deck cover, the hooks being connected to the deck and the deck cover forming apertures suitable for receiving the hooks; and (f) pins extending upwardly from the deck for preventing horizontal or lateral movement of the deck cover relative to the deck, the pins being received by pin apertures formed by the deck cover proximate its first lateral edge.

5. A harvesting device cutting unit comprising:
(a) a cutting element;
(b) a frame for rotatably supporting the cutting element;
(c) a plastic cover for the cutting element frame;
(d) first means for downwardly securing the cover to the frame comprising a magnetic latch; and
(e) second means for laterally securing the cover to the frame, wherein:
 (i) the cover comprises first and second edges;
 (ii) the magnetic latch comprises a first magnetic element connected to the frame and a second magnetic element connected to the first edge of the cover, wherein when the cover is connected to the frame, the first magnetic element is in direct contact with and acts upon the second magnetic element to assist in downwardly drawing the first edge of the cover against the frame;
 (iii) the first securing means further comprises means for downwardly holding the second edge of the cover against the frame; and
 (iv) the second securing means comprises mechanical means for engaging the first edge of the cover and preventing lateral movement of the cover relative to the frame.

6. The cutting unit of claim 5, wherein the second edge downward holding means comprises a hook connected to the frame, wherein the hook engages a hook aperture formed by the second edge of the cover.

7. The cutting unit of claim 5, wherein the second edge downward holding means comprises a flange connected to the frame, wherein the flange engages the second edge of the cover.

8. The cutting unit of claim 5, wherein the first magnetic element comprises a permanent magnet and the second magnetic element comprises a magnetic plate connected to the cover.

9. A harvesting device cutting unit comprising:
(a) a cutting element;
(b) a frame for rotatably supporting the cutting element;
(c) a plastic cover for the cutting element frame, the cover having a generally flat top portion;
(d) first means for downwardly securing the cover to the frame comprising a magnetic latch; and
(e) second means for laterally securing the cover to the frame, wherein:
 (i) the cover comprises first and second edges;
 (ii) the magnetic latch comprises a first magnetic element connected to the top of the frame and a second magnetic element connected to the first edge of the cover, on the underside of the top portion thereof, wherein when the cover is connected to the frame, the first magnetic element acts upon the second magnetic element to assist in downwardly drawing the first edge of the cover against the frame;
 (iii) the first securing means further comprises means for downwardly holding the second edge of the cover against the frame; and
 (iv) the second securing means comprises mechanical means for engaging the first edge of the cover and preventing lateral movement of the cover relative to the frame.

* * * * *